United States Patent
Kim et al.

(10) Patent No.: US 7,848,525 B2
(45) Date of Patent: Dec. 7, 2010

(54) HYBRID BROADCAST ENCRYPTION METHOD

(75) Inventors: Hwan-joon Kim, Seoul (KR); Dae-youb Kim, Seoul (KR); Sung-joon Park, Seoul (KR); Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 11/346,194

(22) Filed: Feb. 3, 2006

(65) Prior Publication Data
US 2006/0177067 A1 Aug. 10, 2006

(30) Foreign Application Priority Data
Feb. 3, 2005 (KR) .................. 10-2005-0009820

(51) Int. Cl.
*H04L 9/00* (2006.01)
(52) U.S. Cl. .............. 380/278; 380/277; 380/281; 380/284; 380/44; 380/47; 713/150; 713/171
(58) Field of Classification Search ............ None
See application file for complete search history.

(56) References Cited

U.S. PATENT DOCUMENTS

| 5,604,804 A * | 2/1997 | Micali ............ 713/157 |
| 6,226,743 B1 * | 5/2001 | Naor et al. ............ 713/177 |
| 6,701,434 B1 * | 3/2004 | Rohatgi ............ 713/168 |
| 7,043,024 B1 * | 5/2006 | Dinsmore et al. ............ 380/278 |
| 2006/0107043 A1 * | 5/2006 | Kim et al. ............ 713/163 |
| 2006/0248339 A1 * | 11/2006 | Kim et al. ............ 713/180 |
| 2007/0079118 A1 * | 4/2007 | Chmora et al. ............ 713/163 |
| 2007/0140483 A1 * | 6/2007 | Jin et al. ............ 380/44 |

FOREIGN PATENT DOCUMENTS

JP 2004349733 A * 12/2004

OTHER PUBLICATIONS

English translation of JP 2004349733 A.*

* cited by examiner

*Primary Examiner*—Taghi T Arani
*Assistant Examiner*—Amir Mehrmanesh
(74) *Attorney, Agent, or Firm*—Sughrue Mion, PLLC

(57) ABSTRACT

A hybrid broadcast encryption method is provided. The hybrid broadcast encryption method includes setting initialization values, generating a node secret using the initialization values; generating a private secret using the node secret; sending the node secret and the private secret; generating a broadcast message based on a revoked group; encrypting a session key using a key encryption key (KEK) which is allocated to every user group and the broadcast message; and broadcasting to every user the encrypted session key and the broadcast message.

13 Claims, 3 Drawing Sheets

FIG. 3

| PID.001 | | length.P1 | | | | |
|---|---|---|---|---|---|---|
| TID.001 | length.T1 | NID.1 | NID.2 | NID.3 | ··· | NID.numT1 |
| TID.002 | length.T2 | NID.1 | NID.2 | NID.3 | ··· | NID.numT2 |
| PID.002 | | length.P2 | | | | |
| TID.001 | length.T1 | NID.1 | NID.2 | NID.3 | ··· | NID.numT1 |
| TID.002 | length.T2 | NID.1 | NID.2 | NID.3 | ··· | NID.numT2 |
| ⋮ | | | | | | |
| PID.00N | | length.PN | | | | |
| TID.001 | length.T1 | NID.1 | NID.2 | NID.3 | ··· | NID.numT1 |
| TID.002 | length.T2 | NID.1 | NID.2 | NID.3 | ··· | NID.numT2 |

HYBRID BROADCAST ENCRYPTION METHOD

CROSS-REFERENCE TO RELATED APPLICATIONS

This application claims priority from Korean Patent Application No. 2005-09820, filed on Feb. 3, 2005, the entire contents of which are incorporated herein by reference.

BACKGROUND OF THE INVENTION

1. Field of the Invention:

Methods consistent with the present invention relate to a broadcast encryption (BE) method, and more particularly, to a hybrid broadcast encryption method using Rivest-Shamir-Adleman (RSA) calculations, combinations, and tree structures together.

2. Description of the Related Art:

In general, encryption systems are classified into a symmetric key (or referred to as a secret key) encryption system and an asymmetric key (or referred to as a public key) encryption system depending on encryption-key management schemes. The symmetric key encryption system is the encryption system that was mainly used before the public key encryption system emerged, which is the system using the same key for encryptions and decryptions. For example, if a sender converts a desired plain message into an encrypted message through an encryption key and an encryption algorithm and sends the encrypted message to a receiver, the receiver converts the encrypted message into the original plain message by applying the same key to a decryption algorithm.

Thus, the receiver has to exchange keys safely prior to the encrypted communications, and a third party who attempts to look at the encrypted communications cannot read the original message without the keys that the sender and receiver have used. However, problems in key managements and exchanges can occur since, if encrypted communications are intended with lots of parties, the number of keys to be managed accordingly increases.

Compared to the above, the asymmetric key encryption system is based on mathematical functions, in which, unlike the symmetric key encryption system, there exists a pair of keys so that one of the keys is open to anyone else for use and the other key is kept secret by himself or herself. In this case, an open key is referred to as a public key, and the secretly-kept key is referred to as a private key.

In order for a sender and a receiver to do encryption communications by using the public key, first the sender encrypts a message by a public key of the receiver to send the encrypted message to the receiver, and the receiver decrypts the encrypted message by using a private key of his own to obtain the plain message. Even though someone gets an encrypted message on networks, data can be safely sent since the encrypted message cannot be decrypted without the private key, for the private key is kept by its owner all the time and has no need to be open or sent to others.

On the other hand, the symmetric key (or cipher) is mainly used to encrypt or decrypt broadcast streams, for the encryption and decryption can be carried out very rapidly when the symmetric key is used and the symmetric key can be safely sent through a limited access system to which only restricted and authenticated users have access.

Content creators create various useful data such as audio and video data in a data transmission system based on general broadcast encryptions, and provide the created data to service providers. The service providers broadcast the data of the content creators through various wire and wireless communication networks to paid authorized users such as smart home Digital Rights management (DRM) networks and mobile DRM networks.

FIG. 1 is a view showing a general broadcast transmission system. In FIG. 1, a service provider 100 produces a broadcast message 110 and sends the broadcast message 110 to users through various transmission channels 120. The broadcast message 110 is sent to privileged users 130 as well as to revoked users. Thus, the service provider 100 allocates a separate key to encrypt the broadcast message 110 in order for the privileged users 130 to read the sent broadcast message 110. Therefore, one issue in the broadcast system is the method of producing a certain group key in order for only the privileged users 130 to decrypt the encrypted broadcast message.

For example, the service provider 100 can send data through satellites to users' devices such as set-top boxes coming with various satellite receivers, as well as send the data even to mobile communication terminals through mobile communication networks. Further, the service provider 100 can send the data to various terminals on a smart home network through the internet network.

On the other hand, the service provider 100 encrypts the data by using the broadcast encryption (BE) in order for the data not to be used by unauthorized users unpaid for corresponding data.

The security in such an encryption/decryption system mainly depends on a system for managing encryption keys. Further, methods for generating encryption keys are important in such an encryption key management system. In addition, it is important to manage and update the generated encryption keys.

On the other hand, the data transmission method by using the public key is a method for sending data including key values of authorized users when data is sent. That is, data sent by the service provider 100 through a broadcast or home network contains a header portion having authentication information and an encrypted data portion having substantial data information.

Thus, the header portion contains a group identification (ID) and key value information of authenticated users included in each authorized group so that, of plural users, data can be sent to only the users of the authorized groups.

Therefore, if data is encrypted and sent through a certificate revocation list (CRL) and online certificate status protocol (OCSP) information, users receiving the data check their own key value information included in the header portion of the data, get authenticated in due course, and use their desired data.

On the other hand, the header portion in the broadcast encryption (BE) scheme contains only information about a group ID and a key value for a certain group. Thus, the privileged users of authenticated groups can use their own group key values in order to decrypt the received data into original data.

There exist additional methods disclosed in the 'Broadcast Encryption' (Fiat et al., Crypto '93 LINCS, vol. 839, pp 480-491, which is, hereinafter, referred to as 'Fiat algorithm') for broadcasting encryption keys. The 'Fiat algorithm' proposes two basic broadcast encryption algorithms and an algorithm having higher security against collusion attacks.

Hereinafter, description will be made in brief on the Fiat algorithm. Coefficients are first defined as below for the description of the Fiat algorithm.

U: Set of users with |U|=n

P: Set of privileged users with |U−P|=r

N: RSA composite $y_1, \ldots, y_n$: Distinct primes $usr_i$: A user in U where $1 \leq i \leq n$ O: A positive integer satisfying $1 < O < N$ The Fiat algorithm enables a server to produce system coefficients N, $y_1, \ldots, y_n$, and O, of the defined coefficients, in a system initialization step, and discloses the coefficients N, $y_1, \ldots, y_n$, of the system coefficients, in order for anyone to look them up. Further, if a user $usr_i$ subscribes to services, the server carries out tasks as below:

1. assign a value $y_i$ to a user $usr_i$
2. calculate secret information, $u_i = O^{y_i(mod\ N)}$, of the user $usr_i$
3. send the calculated secret information safely to the user $usr_i$ The initialization and user subscription steps are completed through the above tasks. Now, if given a group of privileged users, $P \subset U$, a group key $K_p$ for each user is expressed in Equation 1:

$$K_p = O^{\prod_{usr_s \in P} y_s} (\text{mod}\ N) \qquad [\text{Equation 1}]$$

Here, users included in P can use the value ui assigned from the server to calculate the group key Kp of Equation 1 by using Equation 2:

$$K_p = u_i^{\prod_{usr_s \in P-(usr_i)} y_s} (\text{mod}\ N) \qquad \{\text{Equation 2}\}$$

Here, unauthorized subscribers or revocaters who are not normal subscribers have, in the exponent part $u_i$, the distinct prime $y_i$ not included in the exponent part of $K_p$, so the group key $K_p$ can be calculated when the distinct prime $y_i$ is eliminated from the exponent part.

However, the calculation is practically impossible due to a problem of 'difficult prime factorization of N'. Thus, the broadcast encryption becomes possible for privileged users through the above method.

However, the above Fiat algorithm causes a serious security problem when two users, for example, $usr_1$, and $usr_2$, share the secret information with each other. That is, since $y_i$ and $y_j$ are primes to each other, integers a and b satisfying $ay_i + by_j = 1$ can be easily obtained. Therefore, the two users can obtain a value of O, being the secret system information, by using Equation 3:

$$u_i^a u_j^b \equiv O^{ay_i + by_j} = O (\text{mod}\ N) \qquad [\text{Equation 3}]$$

Thus, the unauthorized users can obtain the group key $K_p$ in all circumstances by using the value of O. That is, if two malicious users collude with each other, the two basic algorithms allow the system to be insecure since the secret information of a server broadcasting content is leaked out.

As above, systems referred to as '1-resilient systems' are ones secure against one aggressive operator but not secure against two aggressive operators. On the other hand, Fiat proposes a k-resilient system based on the 1-resilient system, but the k-resilient system has a problem of high inefficiency.

The k-resilient system is that receivers (t number of receivers at maximum) eliminate an arbitrary number of receivers colluding with one another. However, the method needs a relatively long message, relatively many keys stored in a receiver, and more decryption operations than one by each receiver. Further, the method does not take a stateless receiver scenario into consideration.

Thus, there is a need in the art to be able to avoid an assumption about how many receivers may collude with one another. Further, the message size and the number of stored keys need to be minimized, and the decryption operations to be carried out by a receiver have to be minimized for optimal performance.

On the other hand, the other systems like the Fiat system do not provide the stateless receiver scenario, so that the other systems cannot be effectively applied to the protection of content on recording media.

SUMMARY OF THE INVENTION

An aspect of the present invention is to provide a hybrid broadcast encryption method which is secure against collusion attacks, capable of reducing the overhead of transmissions and calculations, and provided with risk distribution functions, compared to the existing Fiat method.

The foregoing and other aspects are substantially realized by providing a hybrid broadcast encryption method, comprising setting initialization values for generating a node secret and a private secret for every user, and sending the node secret which is generated using the initialization values and the private secret which is generated using the node secret; and broadcasting to every user an encrypted session key which is encrypted using a key encryption key (KEK) allocated to every use group and a predetermined broadcast message which is generated based on a revoked group R. The KEK may be calculated based on the node secret and the predetermined broadcast message and used to decrypt the encrypted session key.

The KEK is a group key temporarily and randomly decided every time a content of a server is encrypted and sent to a user.

Sending the node secret and private secret may include allocating a different value to every user as a base by using combinations, and deciding the number of user groups L and the number of trees M belonging to every user group depending on the given number of users n; building LM trees each having n/LM leaves, and matching respective users to leaves of the trees; and generating the node secret and the private secret by using predetermined equations, and sending the node secret and the private secret to every user.

The node secret is calculated based on an equation:

$$n(i,j,k) = O(\sigma(i,j,k))^{x(i)y(i,j)p(i,j,k)} \bmod N_i, \text{ wherein the } n(i,j,k)$$

denotes a secret at a kth node of a jth tree belonging to an ith user group, x(i) denotes a secret of each user group, y(i,j) denotes a secret of the jth tree belongint to the ith user group, and p(i,j,k) denotes a prime at the kth node of the jth tree belonging to the ith user group, σ(i,j,k) denotes a permutation of the kth node of the jth tree belonging to the ith user group, and $N_i$ denotes an RSA modulus of the ith user group.

The private secret may denote a set of node secrets of all ancestor node.

The broadcasting may include generating plural random numbers w(1,i) and w(2,i) for every user group; calculating P(i,R) and P(i,j,R) with respect to a given revoked group R by using a predetermined equation; generating broadcast messages $\overline{O}(t,i)$ and e(i,j) based on the calculated P(i,R) and P(i,j,R); and broadcasting the encrypted session key and the broadcast messages $\overline{O}(t,i)$ and e(i,j).

The P(i,R) is calculated based on an equation: $P(i,R) = \prod_{v(i,j,k) \in cover(G(i)-R)} p(i,j,k) \bmod \phi(N_i)$, for $i \in [1,L]$, wherein, cover(G(i)−R) denotes the exclusion of leaves of a predetermined tree to which revoked users belong, and p(i,j,k) denotes a prime of a kth node of a jth tree to which an ith user group belongs.

The P(i,j,R) is calculated based on an equation: $P(i,j,R) = \Pi_{v(i,j,k) \in cover(G(i)-R)} p(i,j,k) \mod \phi(N_i)$, for $i \in [1,L] \times [1M]$, wherein, cover(G(i)−R) denotes the exclusion of leaves of a predetermined tree to which revoked users belong, and p(i,j,k) denotes a prime of the kth node of the jth tree to which the ith user group belongs.

$\overline{O}(t,i)$ is calculated based on an equation: $\overline{O}(t,i) = w(1,i) O_t^{-w(2,i)x(i)y(i)P(i,R)} \mod N$ for $(t,i) \in [1,C] \times [i,L]$, wherein, w(1,i) denotes a random number, x(i) denotes a secret of each user group, and y(i,j) denotes a secret of the jth tree belonging to the ith user group.

The value of e(i,j) is calculated based on an equation: $e(i,j) = w(2,i) y(i) P(i,j,R) / y(i,j) \mod \phi(N)$ for $(i,j) \in [1,L] \times [1,M]$, wherein, w(2,i) denotes a random number, x(i) denotes a secret of each user group, y(i,j) denotes a secret of the jth tree belonging to the ith user group.

The KEK is expressed in $w(1,i)^d$.

The KEK is calculated based on an equation:

$$KEK = n(i, j, k)^{e(i,j) \Pi_{v(i,j,s) \in cover(G(i)-R) \text{ and } s \neq k} p(i,j,s)} \prod_{t \in \sigma(i,j,k)[d]} \overline{o}(ti),$$

wherein, n(i,j,k) denotes a secret of the kth node of the jth tree belonging to the ith user group, and $\overline{O}(t,i)$ and e(i,j) are broadcast messages sent from a server.

BRIEF DESCRIPTION OF THE DRAWINGS

The above and other aspects of the present invention will be more apparent by describing certain exemplary embodiments of the present invention with reference to the accompanying drawings, in which:

FIG. 3 is a view for showing an index structure according to an exemplary embodiment of the present invention.

DETAILED DESCRIPTION OF EXEMPLARY EMBODIMENTS OF THE PRESENT INVENTION

Figure 1:
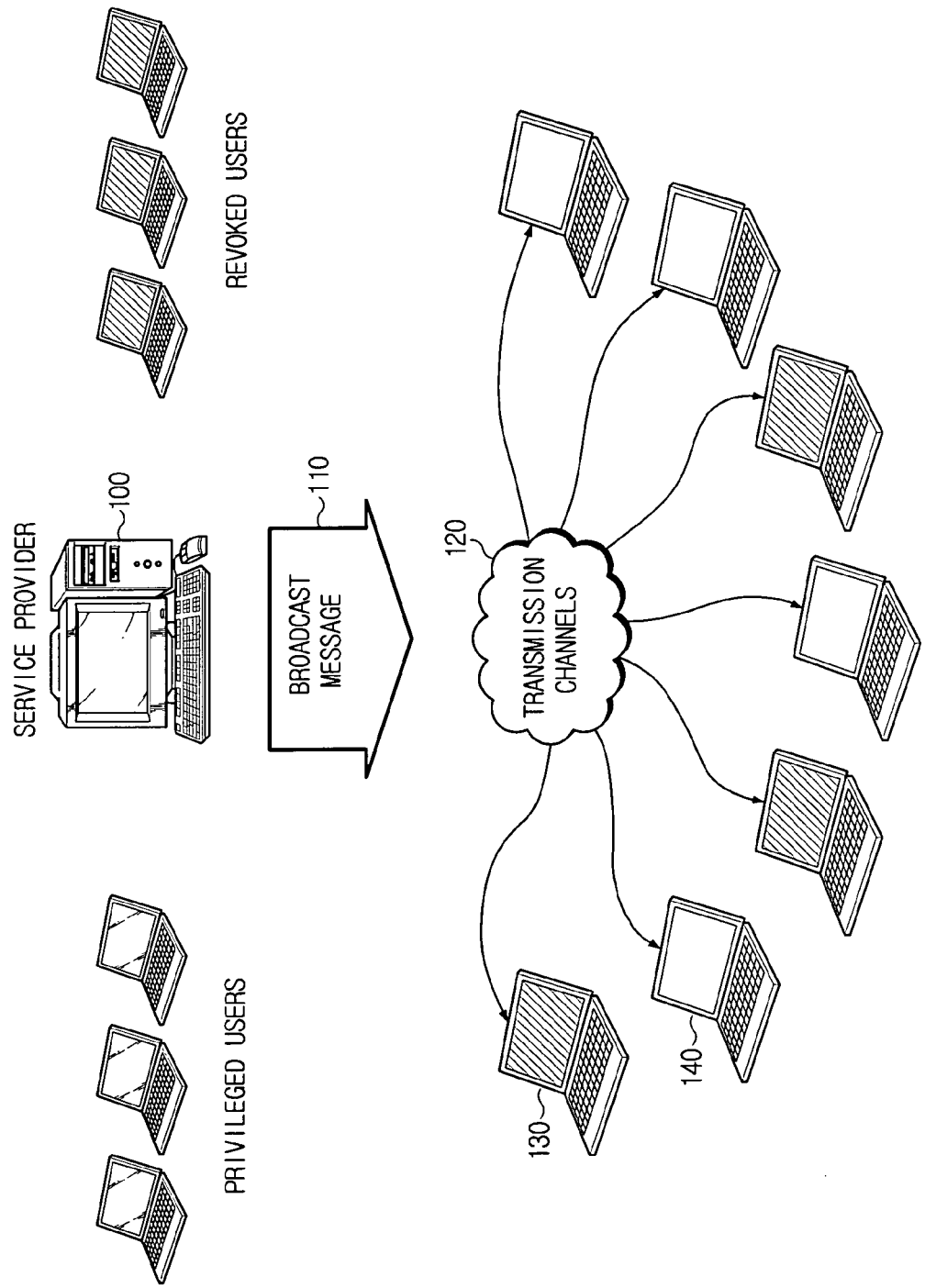
FIG. 1 is a view for showing a general broadcast transmission system.

First, definitions are provided for coefficients for a hybrid broadcast encryption method according to an exemplary embodiment of the present invention.

U: Set of users with |U|=n
P: Set of privileged users with |U−P|=r
R: Set of revoked users, i.e. U−R=P
d, C: some integer such that binomial(C,d)>2n
L: number of partitions of U
M: number of trees in each partition (ex: LM is the number of all trees)
$N_i (i=1, \ldots, L)$: RSA modulus with m bits
$\omega(1,i), \omega(2,i) (i=1, \ldots, L)$: random number with m bits
G(i), (i=1, ..., L): L-partition of U
x(i), (i=1, ..., L): secret of G(i), (m bits)
T(i,j): jth Tree of G(i) which of each has n/LM elements G(i) as leaves
y(i,j), (i=1, ..., L, j=1, ..., M): secret of T(i,j), (m bits)
$y(i) = \Pi_{j=1,\ldots,M} y(i,j) \mod \phi(N)$, (i=1, ..., L) (m bits)
v(i,j,k): kth node of T(i,j)
p(i,j,k): small prime of v(i,j,k), which has size length(p)
σ(i,j,k): permutation of v(i,j,k) on [d]→[C]
O: A positive integers satisfying 1<O <N
$O_1, \ldots, O_C$: Positive integers satisfying $1 < O_S < N$ and $\gcd(O_S, N) = 1$
$O(\sigma(i,j,k))$: $\Pi_{1 \in \sigma(i,j,k)[d]} O_1$
user(i,j,k): user which corresponds to the leaf v(i,j,k)

1. Characteristics and Functions of a Hybrid Broadcast Encryption Algorithm According to an Exemplary Embodiment of the Present Invention.

The present hybrid broadcast encryption algorithm divides users into L groups, uses independent parameters as to the respective groups, and has a function for improving system security by preventing a security problem such as partial leakage of an RSA modulus and the like from spreading over an entire system, if possible.

Below is provided an analysis of performance of the present hybrid broadcast encryption method.

TO=128 (CL+LM)+16L bytes (fixed).

SO=128 $\log_2$(n/LM)+αbytes (fixed).

CO=1024+length(p)((n/2LM)−1) bits exponentiation (min.=1024)

Here, TO denotes a transmission overhead indicating a header amount for each server to send, SO denotes a storage overhead which indicates an amount of encryption keys for users to store, and CO denotes a computation overhead necessary for users to obtain a session key.

Table 1 below shows the performance of the hybrid broadcast encryption method according to an exemplary embodiment of the present invention, which lists the detailed performance according to the embodiment having $n=2^{20}$, $r=2^{15}$, and length(p)=16. Further, security is fully taken into consideration, so it is assumed that C=30 and d=15.

TABLE 1

| Basic L, M, (n/LM) | Transmission (kbyte) | Storage (byte) | Computation (bit) |
|---|---|---|---|
| | (128(CL + LM) + 16L)/$2^{10}$ | 128$\log_2$(n/LM) + α | 1024+ len(p)((n/2LM) − 1) |
| $2^7, 2^7, 2^6$ | 2530 | 768 | 1520 |
| $2^6, 2^7, 2^7$ | 1265 | 896 | 2032 |
| $2^6, 2^6, 2^8$ | 753 | 1024 | 3056 |
| $2^5, 2^7, 2^8$ | 633 | 1024 | 3056 |
| $2^5, 26, 2^9$ | 377 | 1152 | 5104 |
| $2^4, 2^7, 2^9$ | 317 | 1152 | 5104 |
| $2^4, 2^6, 2^{10}$ | 189 | 1280 | 9200 |
| $2^3, 2^7, 2^{10}$ | 159 | 1280 | 9200 |
| $2^3, 2^6, 2^{111}$ | 95 | 1408 | 17392 |

2. Process for the Hybrid Broadcast Encryption Algorithm According to an Exemplary Embodiment of the Present Invention.

The present hybrid broadcast encryption method comprises setting initialization values for issuing node secrets and private secrets to a plurality of respective users, and sending the plurality of respective users the node secrets issued using the initialization values and the private secrets issued using the node secrets, and broadcasting to the plurality of respective users an encrypted session key which is encrypted using a key encryption key (KEK) allocated to a plurality of respective user groups and a broadcast message which is generated based on a revoked group (R). The KEK is calculated based on the node secrets and the broadcast message and used to decrypt the encrypted session key.

Figure 2:
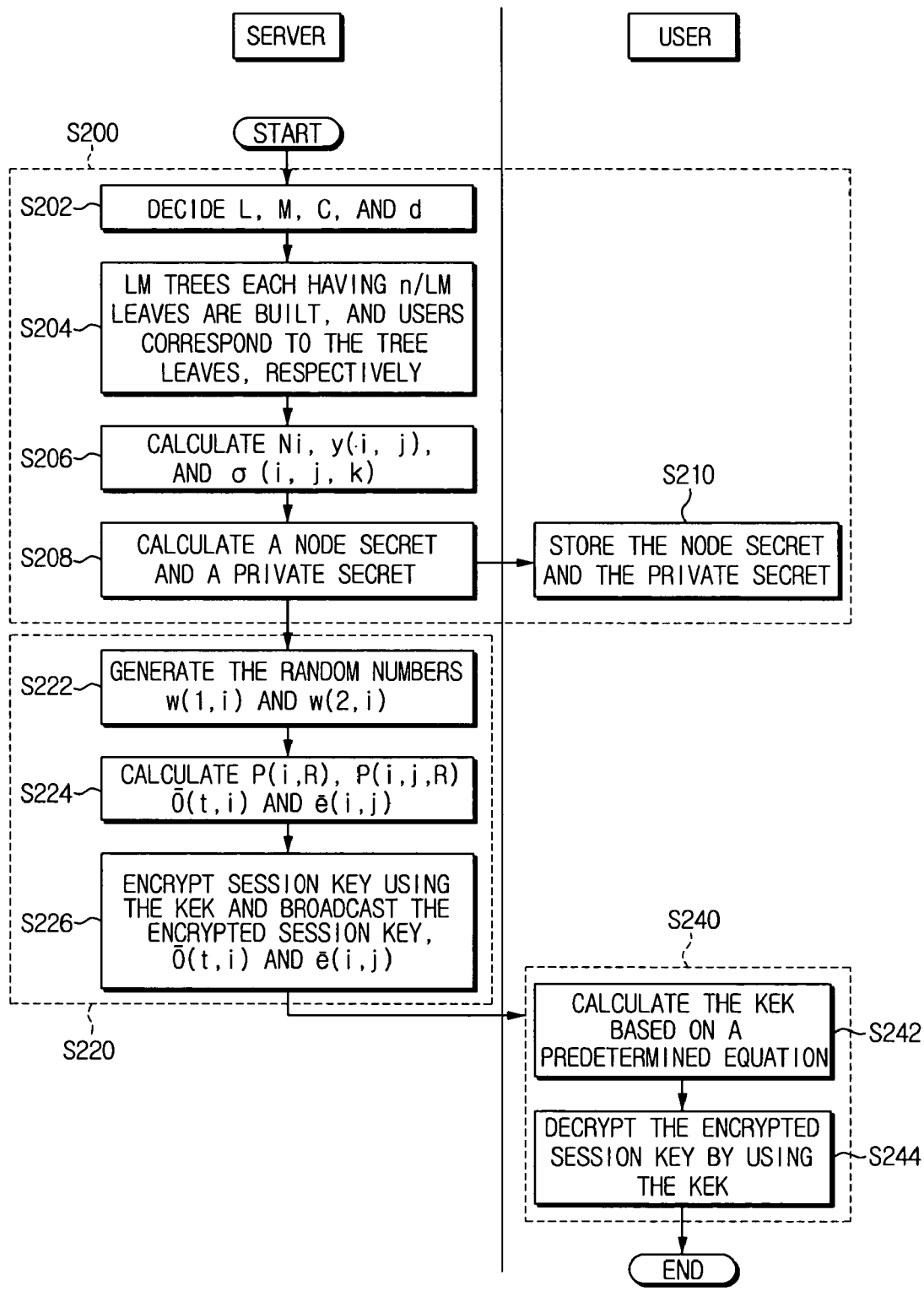
FIG. 2 is a flow chart for explaining a hybrid broadcast encryption method according to an exemplary embodiment of the present invention.

Referring now to FIG. 2, the setting initialization values is carried out as below for issuing node secrets and private secrets to the plurality of respective users and sending the node secrets and the private secrets to the users (S200).

The server decides L, M, C, and d as the initialization values (operation S202). First, the server decides L and M depending on the given number of users n. The appropriate L and M for system purposes are determined with reference to the TO/SO/CO mathematical expressions of Table 1. For example, in Table 1, if the transmission overhead (TO) in Table 1 is restricted to less than 200 kbytes, the storage overhead(SO) to more than 1200 bytes, and calculation overhead(CO) to more than 9000 bytes, the L, M, and n/LM can be $(2^4, 2^6, 2^{10})$, $(2^3, 2^7, 2^{10})$, and $(2^3, 2^6, 2^{11})$, respectively.

If the server decides the number of user groups L as an appropriate object of the system and the number of trees belonging to the user group M in the above manner, the server decides the C and d according to their definitions. Since ${}_cC_d$ >2n by definition, the server decides the C and d satisfying $$\frac{C!}{d!(C-d)!} > 2n.$$

Next, LM trees each having n/LM leaves are built, and users correspond to the tree leaves, respectively (S204).

Next, the server generates Ni, y(i,j), p(i,j,k), and σ(i,j,k) for all of i, j, and k (operation S206). It is advantageous if Ni is 1024 bits. Next, the server generates a node secret as expressed in Equation 4 as below based on Ni, y(i,j), p(i,j,k), and σ(i,j,k) (S208).

Node secret of $v(i,j,k)$:$n(i,j,k)=O(\sigma(i,j,k))^{x(i,j) \cdot y(i,j)p(j,i,k)}$ mod Ni [Equation 4]

If the node secret is generated as above, the server generates sets of node secrets of all previous nodes as a private secret as expressed in Equation 5 below, and sends the generated node secret and the private secret to a user respectively.

Private secret of user(i,j,k):the collection of $n(i,j,l)$'s for all ancestors $v(i,j,l)$ of $v(i,j,k)$ [Equation 5]

Further, the user safely receives from the server and stores the node secret and the private secret (S210).

The node secrets/private secrets sending stage ends after the above steps, and the next stage is carried out by sending an encrypted session key and broadcast message (S220).

The server generates random numbers w(1,i) and w(2,i) for every encryption session (i=1, ..., L) (S222). The random numbers w(1,i) and w(2,i) have to be smaller than the RSA modulus Ni for i=1, ..., L. Further, a random number is newly generated for every session all the time, and separately generated for every user group.

The server calculates P(i,R) and P(i,j,R) for a given revoked group R as expressed in Equations 6 and 7 below (S224).

$P(i,R)=\Pi_{v(i,j,k) \in cover(G(i)-R)} P(i,j,k) \bmod \phi(N_i)$, for $i \in [1.L]$ [Equation 6]

$P(i,j,R)=\Pi_{v(i,j,k) \in cover(G(i)-R)} P(i,j,k) \bmod \phi(N_i)$, for $i \in [1,L] \times [1,M]$ [Equation 7]

The term of cover(G(i)–R) in Equations 6 and 7 is a general scheme excluding a corresponding leaf from a tree, which is disclosed in RFC 2627.

The server calculates broadcast messages $\overline{O}(t,i)$ and e(i,j) as expressed in Equation 8 and 9, based on P(i,R) and P(i,j,R) calculated in Equations 6 and 7 (S224).

$\overline{O}(t,i)=w(1,i)O_t^{-(2,i) \times (i) y(i) P(i,R)} \bmod N$ for $(t,i) \in [1.C] \times [i,L]$ [Equation 8]

$e(i,j)=w(2,i)y(i)P(i,j,R)/y(i,j) \bmod \phi(N)$ for $(i,j) \in [1,L] \times [1.M]$ [Equation 9]

The server encrypts a session key by using KEK so as to generate an encrypted session key. Here, the KEK is a group key allocated to every user group and temporarily and randomly decided every time a content of a server is encrypted and transmitted to respective users. The server broadcasts the encrypted session key and the broadcast messages $\overline{O}(t,i)$ and e(i,j), which is calculated through Equations 8 and 9, to a user via a general communication path (S226).

If the second stage ends in the above manner, the third stage is carried out as a session key decryption stage (S240).

Each user (i,j,1) calculates, based on Equation 10 below, a Key Encryption Key (KEK) which is a group key corresponding to a group, using the broadcast messages $\overline{O}(t,i)$ and e(i,j) broadcast from the server and the node secret n(i,j,k) having a value known to the user (operation S242). This value may be pre-stored.

$$KEK = n(i,j,k)^{e(i,j) \Pi_{v(i,j,s) \in cover(G(i)-R) and s \neq k} P(i,j,s)} \prod_{t \in \sigma(i,j,k)[d]} \overline{o}(ti) \quad \text{[Equation 10]}$$

The KEK is $w(1,i)^d$, which is calculated from Equation 10.

As above, if the second stage calculates the KEK which is a group key corresponding to a group according to the Equation 10, the server decrypts the encrypted session key by using each calculated KEK (S244).

3. Index.

Description will now be made of an index for expressions of the broadcast messages $\overline{O}(t,i)$ and e(i,j) in detail. Diverse index structures can be built according to system purposes, which are used for the hybrid broadcast encryption method according to an exemplary embodiment of the present invention. An index proposed in the present invention uses three IDs of "PID", "TID", and "NID".

The "PID" is an index allocated to every group built through dividing a given user set U. The "PID" has to have at least log(L) bits in size to express each group, but the "PID" is recommended to have a length of log(8L) bits in consideration of scalability.

The "TID" is an index allocated to every tree of each user group. The "TID" identifies only a tree within each user group, and does not identify trees between user groups. Thus, the respective trees within one user group have a unique "TID", but the entire user group has L trees having the same "TID".

The "NID" is allocated to every node within each tree, which is unique within only one tree like the "TID". Therefore, the length of log(n/LM) bits is enough for the "NID".

The index structure is built with "NIDs" of revoked users listed, and does not have respective indices separated by an identifier. Instead, the index structure lists indices to groups and trees to which respective revoked users belong, and indicates sizes of lists of revoked users for every user group and tree behind the respective "PID" and "TID", to reduce its size and speed up processing.

FIG. 3 is a view showing an index structure according to an exemplary embodiment of the present invention. In FIG. 3, a PID.001 is a PID of the first user group having revoked users. Length.P1 to the right of the PID.001 is an index size of a revoked-user list of the first user group, which enables a user not corresponding to the PID.001 to rapidly obtain a next user group PID when skipped by the length.P1. TID.001 is a TID of the first tree having revoked users in a corresponding partition. The TID enables a corresponding user to identify a tree to which the user belongs. If the user does not belong to the tree, the user can obtain the TID of a next tree by skipping by the length.T1.

Next NIDs can provide two options. First, if it is intended to minimize an index size, the NIDs are built with NIDs of revoked users from the corresponding tree. Here, the number of the NIDs is restricted to the number of the revoked users, so the number of_the NIDs is small, but there exists a disadvantage of increased calculations for obtaining again cover nodes with the number of NIDs. Such a disadvantage is the calculations looking for a cover node of a tree having about 1000 leaves if there are one million users, which is not very a big disadvantage. Here, the index size is calculated to be less than $L*\log(8L)+LM*\log(M)+r*\log(n/LM)$, so the index size has a range of about 63 kb to 83 kb if there are 5% revoked users out of the million users. The alternative method is to select the index NIDi as cover nodes. If doing so, the cover nodes can be instantly obtained, so the load of calculations is reduced by that much, but the index size somewhat increases since the number of cover nodes is $2\log(n/r)$ at maximum compared to the revoked users.

4. Safety.

The method of the present invention provides increased safety in case of attack. Two types of attacks can be considered. The first type of attack is where arbitrary groups of authorized users intend to obtain secret information of a server by using secret information the respective groups have and information broadcast by the server. The second type of attack is where arbitrary groups of revoked users intend to obtain a group key, KEK, by using secret information the respective groups have and information broadcast by the server.

To address the first type, it is considered that the secret information of a server can be leaked out through simultaneous equations for private secret information. Information leakage is highly possible if all combinations of $_cC_d$ are allocated as a base for the secret information of users. Therefore, methods have to be introduced to prevent attackers from collecting equations they want. One such method prevents the attackers from collecting the desired equations when using C=140 and d=70 since the number of all combinations is more than $2^{128}$. Besides, the safety can be improved if d/2 combinations are separately taken out of different partial sets of $O_1, \ldots, O_C$. In the first type of attack, another attack possibility is to be associated with $\overline{O}_S$. $\overline{O}_S$ is protected by two random numbers, generated by a server every broadcast. Since a base part and an exponential part are multiplied by a different random number respectively, a value which can be obtained with $\overline{O}_S$ is a value having an exponent necessary to obtain a group key, KEK, of the exponent part. Since it is impossible to remove the exponent part due to a problem of "prime factorization", the secret information of the server is not leaked out.

Finally, in the first type of attack, there is the possibility of leaking out the information of $\Phi(N)$. That is, if two factors A and B satisfy equations $A \neq B$ and $A \equiv B \pmod{\Phi(N)}$, the information of $\Phi(N)$ can be leaked out. However, it is difficult to obtain such two factors satisfying the above equations since a different random number protects equations associated every time of broadcasting or with every group.

To address the second type of attack, it is impossible to obtain a group key, KEK, based on the fact that the exponent part of private secret information cannot be removed on calculations due to the problem of "prime factorization". Thus, as in Fiat, it is impossible for privileged users to obtain the information of a server.

As aforementioned, the present invention can prevent arbitrary groups of privileged users from obtaining secret information of a server by using their individual secret information and information broadcast by the server. Further, the present invention can prevent arbitrary groups of revoked users from obtaining a group key, KEK, by using their secret information and information broadcast by the server.

Further, the present invention has an advantage of being suitable for mobile digital rights management (mobile DRM) since the transmission overhead is 7 to 23 times reduced compared to conventional technologies if the number of revoked users is small. Furthermore, the present invention has an advantage of less calculation overhead if the number of revoked users is large.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A hybrid broadcast encryption method comprising:
    setting initialization values,
    generating a node secret using the initialization values;
    generating a private secret using the node secret;
    sending the node secret and the private secret;
    generating a broadcast message based on a revoked group;
    encrypting a session key using a key encryption key (KEK) which is allocated to every user group and the broadcast message; and
    broadcasting to every user the encrypted session key and the broadcast message, wherein the broadcasting includes:
        generating plural random numbers w(1,i) and w(2,i) for every user group;
        calculating P(i,R) and P(i,j,R) with respect to the revoked group R by using an equation;
        generating broadcast messages $\overline{O}(t,i)$ and e(i,j) based on the P(i,R) and the P(i,j,R); and
        broadcasting the encrypted session key and the broadcast messages $\overline{O}(t,i)$ and e(i,j),
    wherein the w(1,i) and w(2,i) are random numbers, P(i,R) and P(i,j,R) are predetermined equation, $\overline{O}(t,i)$ and e(i,j) are broadcast messages sent from a server.

2. The method as claimed in claim 1, wherein the KEK is calculated based on the node secret and the broadcast message and the calculated KEK is used to decrypt the encrypted session key.

3. The method as claimed in claim 1, wherein the KEK is a group key temporarily and randomly decided every time a content of a server is encrypted and transmitted.

4. The method as claimed in claim 1, wherein the sending includes:
    allocating to every user a different base by using combinations, and deciding a number of user groups L and a number of trees M which belong to every user group depending on a given number of users n;

building LM trees each having n/LM leaves, and matching respective users to the leaves of the trees; and generating the node secret and the private secret by using equations, and sending the node secret and the private secret to every user.

5. The method as claimed in claim 4, wherein the node secret is calculated based on an equation:

$$n(i,j,k)=O(\sigma(i,j,k))^{x(i)y(i,j)p(i,j,k)} \bmod N_i,$$

wherein the n(i,j,k) denotes a secret at a kth node of a jth tree belonging to an ith user group, x(i) denotes a secret of each user group, y(i,j) denotes a secret of the jth tree belonging to the ith user group, and p(i,j,k) denotes a prime at the kth node of the jth tree belonging to the ith user group, σ(i,j,k) denotes a permutation of the kth node of the jth tree belonging to the ith user group, and $N_i$ denotes a Rivest-Shamir-Adleman modulus of the ith user group.

6. The method as claimed in claim 4, wherein the private secret denotes a set of node secrets of all ancestor nodes.

7. The method as claimed in claim 1, wherein the P(i,R) is calculated based on an equation:

$$p(i, R) = \prod_{v(i,j,k) \in cover(G(i)-R)} p(i, j, k) \bmod \phi(N_i), \text{ for } i \in [1, L]$$

where cover(G(i)−R) denotes an exclusion of leaves of a tree to which revoked users belong, and p(i,j,k) denotes a prime of a kth node of a jth tree to which an ith user group belongs.

8. The method as claimed in claim 1, wherein the P(i,j,R) is calculated based on an equation:

$$p(i, j, R) = \prod_{v(i,j,k) \in cover(G(i)-R)} p(i, j, k) \bmod \phi(N_i), \text{ for } i \in [1, L] \times [1, M]$$

wherein cover(G(i)−R) denotes an exclusion of leaves of a tree to which revoked users belong, and p(i,j,k) denotes a prime of the kth node of the jth tree to which the ith user group belongs.

9. The method as claimed in claim 1, wherein $\overline{O}(t,i)$ is calculated based on an equation:

$$\overline{O}(t,i)=w(1,i)O_t^{-w(2,i)x(i)y(i)P(i,R)} \bmod N \text{ for} (t,i) \in [1,C] \times [i,L]$$

wherein w(1,i) denotes a random number, x(i) denotes a secret of each user group, and y(i,j) denotes a secret of the jth tree belonging to the ith user group.

10. The method as claimed in claim 1, wherein e(i,j) is calculated based on an equation:

$$e(i,j)=w(2,i)y(i)P(i,j,R)/y(i,j) \bmod \phi(N) \text{ for } (i,j) \in [1,L] \times (1,M]$$

wherein, w(2,i) denotes a random number, x(i) denotes a secret of each user group, y(i,j) denotes a secret of the jth tree belonging to the ith user group.

11. The method as claimed in claim 1, wherein the KEK is expressed in $w(1,i)^d$.

12. The method as claimed in claim 1, wherein the KEK is calculated based on an equation:

$$KEK = n(i, j, k)^{e(i,j) \prod_{v(i,j,s) \in cover(G(i)-R) \text{ and } s \neq k} p(i,j,s)} \prod_{t \in \sigma(i,j,k)[d]} \overline{o}(ti)$$

where, n(i,j,k) denotes a secret of the kth node of the jth tree belonging to the ith user group, and $\overline{O}(t,i)$ and e(i,j) are broadcast messages sent from a server.

13. The method as claimed in claim 1, wherein the generating the broadcast message comprises separating users into groups and generating the broadcast message based on a calculated value obtained using the revoked group and a predetermined equation.

* * * * *